United States Patent [19]
Matsuda et al.

[11] Patent Number: 6,112,685
[45] Date of Patent: Sep. 5, 2000

[54] DECK STRUCTURE FOR PERSONAL WATERCRAFT

[75] Inventors: Yoshimoto Matsuda, Kobe; Yasuo Okada, Akashi, both of Japan

[73] Assignee: Kawasaki Jukogyo Kabushiki Kaisha, Kobe, Japan

[21] Appl. No.: 09/327,577

[22] Filed: Jun. 8, 1999

[30] Foreign Application Priority Data

Jun. 12, 1998 [JP] Japan .................................. 10-165097

[51] Int. Cl.$^7$ ........................................................ B63C 7/00
[52] U.S. Cl. ........................................ 114/55.53; 114/55.5
[58] Field of Search .................................. 114/363, 55.5, 114/55.51, 55.53, 55.55, 55.57

[56] References Cited

U.S. PATENT DOCUMENTS 5,076,190  12/1991  Iikawa ..................................... 114/55.57
5,490,474  2/1996  Ikeda ..................................... 114/55.57
5,743,206  4/1998  Hattori ..................................... 114/55.5

FOREIGN PATENT DOCUMENTS

2517868  6/1991  Japan .

*Primary Examiner*—Ed Swinehart
*Attorney, Agent, or Firm*—Marshall, O'Toole, Gerstein, Murray & Borun

[57] ABSTRACT

A deck structure for a personal watercraft is disclosed, wherein, a body of the personal watercraft comprises a hull and a deck having an opening in the rear upper surface thereof. The opening has a substantially rectangular shape in plan view along a length of the body. A seat is placed over the opening. A side opening is formed in an upright portion of the deck under the seat. A detachable hatch is disposed in the side opening, thereby facilitating the mounting and dismounting of an engine in/from a body and the maintenance of the engine.

7 Claims, 6 Drawing Sheets

DECK STRUCTURE FOR PERSONAL WATERCRAFT

BACKGROUND OF THE INVENTION

The present invention relates to a personal watercraft (also called a PWC) planing on the water, and more particularly to a deck structure having a detachable hatch in a deck of the personal watercraft.

DESCRIPTION OF THE RELATED ART

A personal watercraft is used for enjoying leisure or sports. Especially, for the personal watercraft for sporty use, a high-power engine is required for increasing running performance.

The personal watercraft has in general an overall length of about 2–5 m and has a bullet-shape in plan view. A body of the watercraft comprises a hull and a deck covering the hull.

In a rear upper surface of the deck is formed an opening, which is substantially rectangular in plan view along the length of the body. A rider's seat is provided over the opening.

An engine is mounted in a narrow space (hereinafter referred to as "an engine space") having an "inverted T shape" transverse cross section, surrounded by the hull and the deck under the seat.

Because the body of the personal watercraft is wide in its lower portion, the engine space is relatively wide in its lower portion, but narrow in its upper portion through which the engine is mounted. For this reason, the mounting of the engine in the body requires a difficult work to handle, which needs a skilled worker and much time. Moreover, because auxiliary parts such as a carburetor, an exhaust pipe, a silencer and an ignition device are located around the engine body, the maintenance of the engine or the adjustment of the carburetor must be carried out in the engine space which is very narrow after the engine has been mounted in the body. Especially, the personal watercraft for sporty use is required to mount the engine of larger displacement for obtaining high power, which makes the space around the engine narrower. Such an example is disclosed in Japanese Utility Model Registration No. 2517868.

Due to the narrow space, a volume of an air intake chamber (an air cleaner is included in this specification) of the engine tends to become insufficient. In this case, the engine itself is restricted from exhibiting full performance.

In order to solve the above-mentioned problems, it is an object of the invention to provide a deck structure for a personal watercraft, which facilitates the mounting and dismounting of the engine and also facilitates the maintenance of the engine, by utilizing a space in the body which has been heretofore a dead space.

SUMMARY OF THE INVENTION

According to the present invention, a deck structure for a personal watercraft including a deck and a hull comprising: the deck having an opening over which a seat is provided, in a rear upper surface of the deck, the opening is substantially rectangular shape in plan view along the longitudinal direction of the body, the deck further having an upright portion formed on a side part thereof under the seat, and having a side opening formed in the upright portion of the deck; and a hatch detachably disposed in the side opening; whereby an engine space and outside of the body are made to communicate with each other through the side opening.

According to the deck structure for the personal watercraft, the hatch can be detached from the deck during mounting of the engine in the body. Although the plan section of engine space in the deck where the opening is formed under the seat is narrow, the detachment of the hatch allows the hands and tools to be inserted into the engine space through the side opening formed in the upright portion of the deck. Consequently, the engine can be easily mounted in the body and dismounted from the body.

For adjusting a carburetor after the engine is mounted in the body, the adjustment can be accomplished easily in a wider space, when the carburetor is positioned inside or near the hatch.

In one embodiment of the deck structure for the personal watercraft, an upper end of the side opening is formed to be connected with the opening formed under the seat, which is more favorable in that the engine can be more easily mounted and dismounted.

In one embodiment of the deck structure for the personal watercraft, the hatch is attached to the side opening through a seal structure. This is a desirable embodiment for obtaining water-tightness inside of the hatch.

In another embodiment, the opening has a length substantially equal to an overall length of an engine body. This construction allows a sufficient space to be obtained for mounting and dismounting of the engine.

In a further embodiment, an air intake chamber is integrally formed with a wall surface of the hatch on the side of the engine space (an inside wall surface of the hatch). In this construction, the air intake chamber itself can be attached or detached with the hatch. Thus, the space between the air intake chamber and a side wall of the body for the attachment and detachment is not necessary. The air intake chamber of a larger capacity can therefore be formed.

In a further embodiment, attachment and detachment of the hatch can be accomplished by the vertical movement of the hatch, and a connecting hole is formed in a lower portion of the air intake chamber, to which an inlet connecting pipe of a carburetor is connectable. With this construction, the connection and disconnection of the carburetor to/from the air intake chamber, as well as attaching and detaching of the hatch can be accomplished at the same time by the vertical movement of the hatch, increasing space efficiency as well as work efficiency.

These objects as well as other objects, features and advantages of the present invention will become more apparent to those skilled in the art from the following description with reference to the accompanying drawings.

BRIEF DESCRIPTION OF THE DRAWINGS

FIG. 7 shows an air intake chamber of different construction.

DESCRIPTION OF THE PREFERRED EMBODIMENTS

A deck structure for a personal watercraft according to an embodiment of the invention will be described below with reference to the accompanying drawings.

Figure 1:
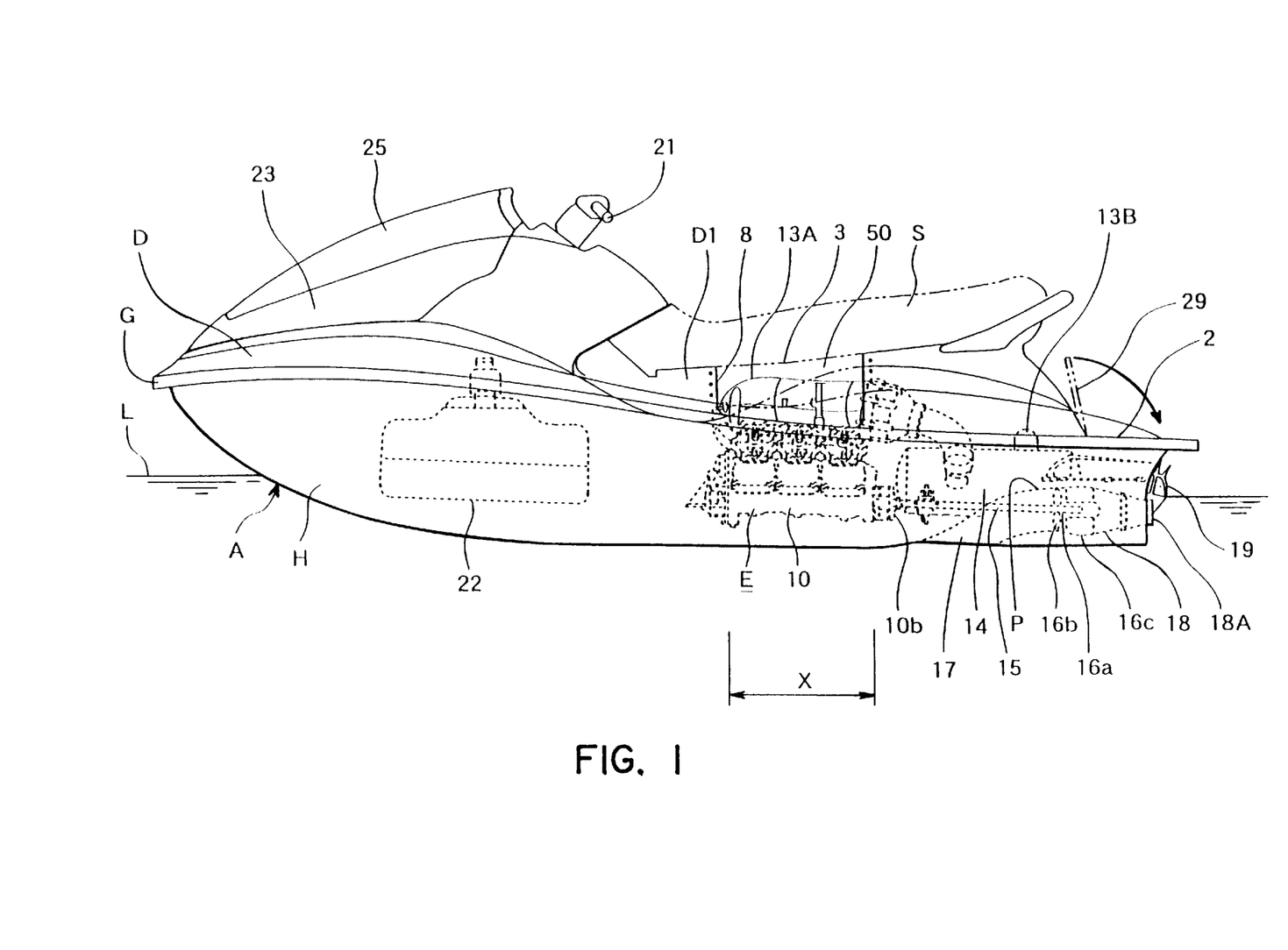
FIG. 1 is a side view of a personal watercraft including a deck structure according to an embodiment of the invention.
Figure 2:
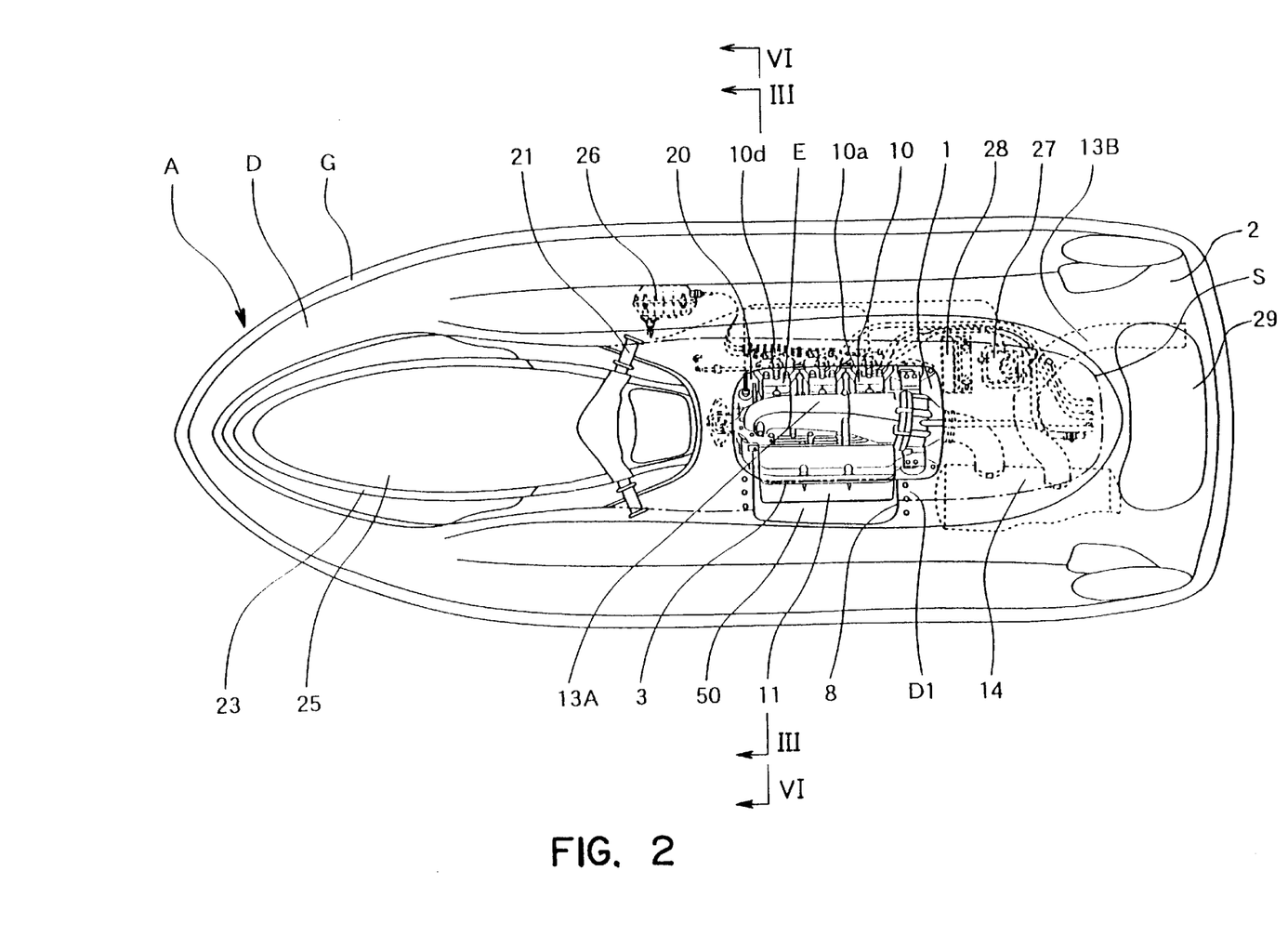
FIG. 2 is a plan view of the personal watercraft of FIG. 1.
Figure 3:
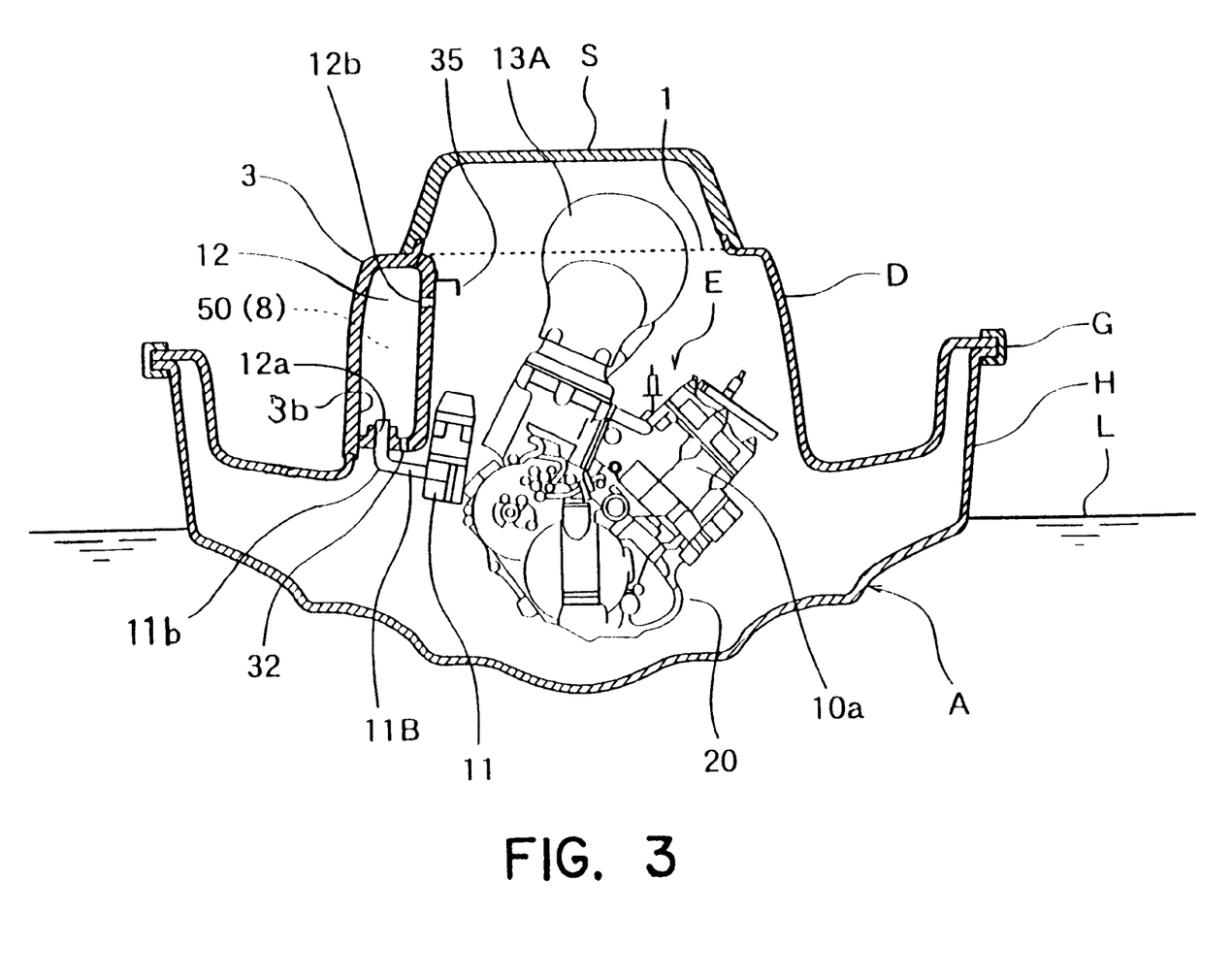
FIG. 3 is a sectional view taken on arrow III—III of FIG. 2.
Figure 4:
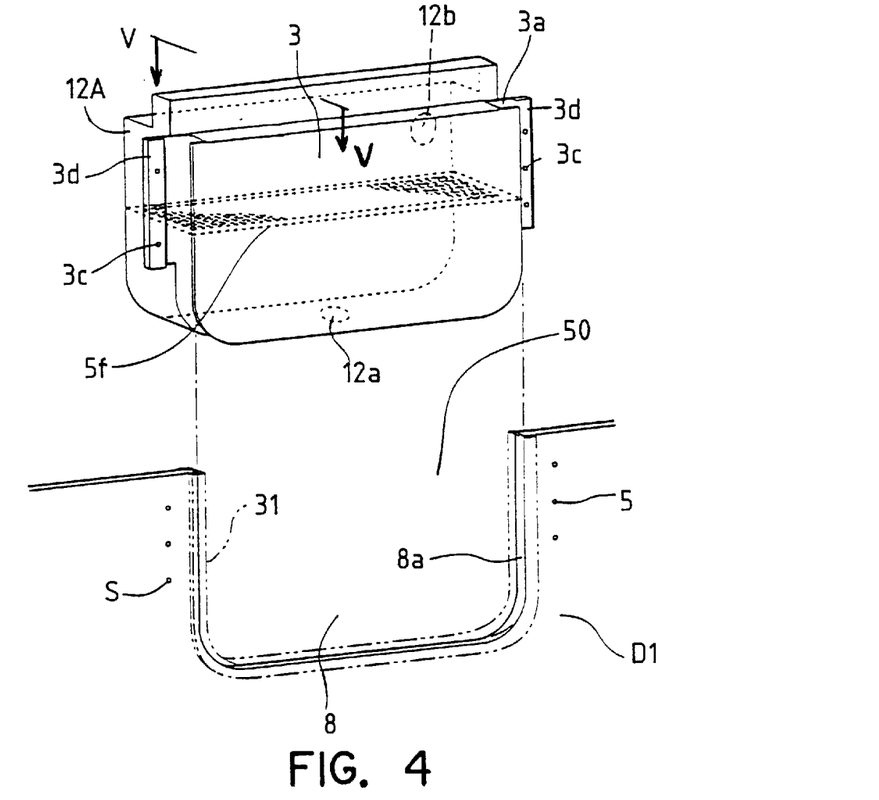
FIG. 4 is an enlarged perspective view of a hatch seen from outside of a body according to the embodiment shown in FIGS. 1 to 3.

FIG. 1 shows a side view of the personal watercraft including the deck structure according to the embodiment. FIG. 2 is a plan view of the personal watercraft of FIG. 1. FIG. 3 is a sectional view taken on arrow III—III of FIG. 2. FIG. 4 is an enlarged perspective view of a hatch according to the embodiment.

Referring to FIGS. 1 to 3, reference symbol A denotes a body. The body A comprises a hull H and a deck D covering the hull H. The circumference of the hull H and the deck D is connected with a so called gunnel line G. In the embodiment, this gunnel line G is positioned above a draft line L of the personal watercraft.

As shown in FIG. 2, the deck D has an opening 1 in the rear upper surface thereof. The opening 1 is substantially rectangular in plan view with its longer side along a longitudinal direction of the body A. As shown in FIGS. 1 and 3, a driver's seat S is located over the opening 1.

An engine E is located in a narrow space 20 (referred to as "an engine space") of an "inverted T" in transverse cross section (see FIG. 3), which is surrounded by the hull H and the deck D under the seat S.

The engine E is a two-cycle/three-cylinder engine. Seen from behind the watercraft as shown in FIG. 3, the engine E is mounted in such a direction that the upper end of a cylinder 10a is inclined rightward seen from behind (see FIG. 2) and a crankshaft 10b (see FIG. 1) is disposed along the longitudinal direction of the body A. A carburetor 11 and an air intake chamber 12 connected to the carburetor 11 are located on the left side of the engine body 10 (on the port of the personal watercraft). An integrated exhaust pipe 13A is located over the engine E. The exhaust pipe 13A is connected to a silencer 14 located diagonally leftward behind the engine body 10. An exhaust pipe 13B which extends from the silencer 14 is curved upward to avoid a propulsion pump P, and the terminal of the exhaust pipe projects outward from a rear end of the body A. An output end of the crankshaft 10b which protrudes rearward from the engine body 10 is connected to a rotating shaft 16a of an impeller 16b of the propulsion pump P through a propeller shaft 15. The outer periphery of the impeller 16b on the rotating shaft 16a is covered with a casing 16c to form the propulsion pump P. The water taken into the propulsion pump P from a water intake 17 disposed in a bottom of the hull is pressurized by the impeller 16b and ejected rearward through a jet nozzle 18 at the rear to obtain a propelling force. In FIGS. 1 to 3, reference numeral 21 denotes a steering handle to swing a steering nozzle 18A behind the jet nozzle 18 so that the watercraft can be steered in a desired direction. A reverse deflector 19 which is pivoted on a horizontal rocking shaft is located upward behind the steering nozzle 18A. By turning the deflector 19 downward behind the steering nozzle 18A, the water discharged backward from the steering nozzle 18A is directed forward to propel the watercraft backward.

In FIG. 1, reference numeral 2 denotes a rear deck. This rear deck 2 includes an openable/closable hatch cover 29. A small-capacity storage box is formed under the hatch cover 29. In FIG. 1, reference numeral 22 denotes a fuel tank for supplying the fuel to the engine E. Reference numeral 23 denotes a front hatch cover. The box (not shown) for storing auxiliary equipment or the like is disposed under this hatch cover 23. Another hatch cover 25 is located over the front hatch cover 23 to form a two-layer hatch cover. A life jacket or the like can be accommodated under the hatch cover 25 through an opening (not shown) formed in a rear end surface thereof.

In FIG. 2, reference numeral 26 denotes an ignition device for supplying a high-voltage current to an ignition plug 10d at appropriate timing. Reference numeral 27 denotes an oil tank for lubrication. Reference numeral 28 denotes a battery.

The personal watercraft constructed as described above has a side opening 8 formed in an upright portion D1 of the deck D which extends upward from a deck floor D2 on which a driver's foot is placed, supporting the seat S and covering the sides of the engine E, as shown in FIGS. 1, 2 and 3, and a hatch 3 is detachably attached to the side opening 8. In the embodiment, the side opening 8 is formed to connect the opening 1 under the seat S to form a single opening. However, the side opening 8 can also be formed as an independent opening apart from the opening 1 as described below.

As shown in FIG. 1, the upper end of the hatch 3 in the closed state may be substantially at the same level with the upper end of the deck D. As shown in FIG. 3, the upper surface of the hatch 3 serves as a receiving surface of the seat S, and the length of the hatch 3 is substantially equal to (or exactly slightly shorter than) an overall length X of the engine body 10. However, the length of the hatch 3 may be longer or shorter than the overall length X of the engine body 10 in accordance with an outer form of the engine E.

Figure 5:
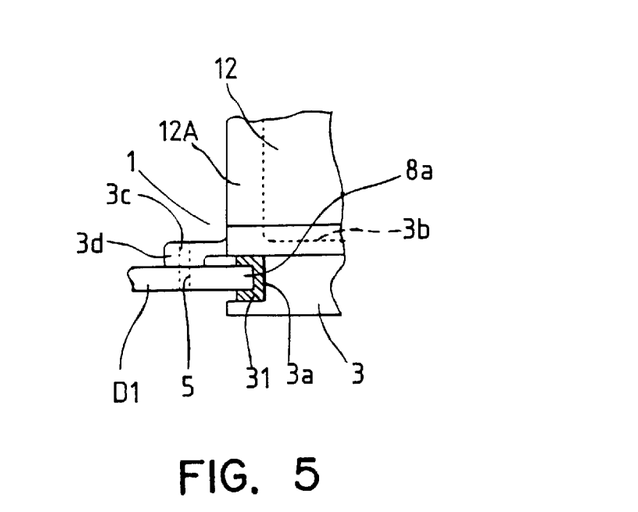
FIG. 5 is an enlarged sectional view of a seal structure of an attaching/detaching portion of the hatch shown in FIG. 4 seen from a direction indicated by arrow V—V of FIG. 4.

A seal member 31 is interposed between the hatch 3 and the side opening 8. In this embodiment, as shown in FIG. 5 as a sealing structure, the elastic seal member 31 is mounted to a peripheral edge 8a of the side opening 8 of the deck D on the side which is in contact with the hatch 3. A U-shaped groove 3a is formed in the peripheral edge of the hatch 3 on the side which is in contact with the deck D. The section of this U-shaped groove 3a is formed slightly narrower than that of the seal member 31 mounted to the peripheral edge 8a. As a result, the seal member 31 is compressed to prevent the water from flowing into the engine space from outside when the hatch 3 is attached to the deck D.

As shown in FIGS. 3 to 5, the air intake chamber 12 is integrally formed with an inner wall surface 3b (on the side of the engine space) of the hatch 3. A connecting hole 12a is formed in a lower surface of the air intake chamber 12. As shown in FIG. 3, an upward tip 11b of an inlet connecting pipe 11B extending from an inlet port of the carburetor 11 is inserted into the connecting hole 12a. The air intake chamber 12 and the carburetor 11 is sealingly connected. Reference numeral 12b denotes the inlet port to the air intake chamber 12. A visor 35 is preferably provided above the inlet port 12b to prevent the water from flowing inward. A plurality of inlet ports 12b, that is, one inlet port 12b or more may be disposed. A drain hole 32 is preferably formed in a bottom portion (preferably the lowest part of the bottom portion) of the air intake chamber 12.

Also in this embodiment, as shown in FIG. 4, flange members 3d, which contacts with inner surface of the deck D, extend substantially parallel to an outer surface of the hatch 3 on both sides thereof. Bolts (not shown) are inserted through holes 3c formed in the flange members 3d and through corresponding holes 5 formed in the deck D, and the tips of the bolts are fixed with nuts (not shown), whereby the hatch 3 is fixed to the deck D.

According to the deck structure for the personal watercraft thus constructed, the air intake chamber 12 is integrally attached to the broad inner surface (the surface facing the engine space) of the hatch. Thus, a desired large-capacity of the air intake chamber 12 is obtained in accordance with the displacement or performance of the engine E. Therefore, the performance of the engine can be fully provided as the result of the reduction of an inlet resistance of the engine.

For the mounting of the engine E in the body A, or for the dismounting of the engine E from the body A, the hatch 3 can be detached from the deck D by unthreading the bolts and nuts, and lifting the hatch 3. Consequently, an access passage 50 to the engine is formed in the deck D of the body A, with the side opening 8 combined with the opening 1 under the seat S. Accordingly, for mounting and dismounting of the engine E, the engine E can be easily brought into the body A, and brought out of the body A through the passage 50 having a larger opening composed of the opening 1 and the side opening 8.

More particularly, because the side opening 8 on the side of the body A is formed to communicate with the upper opening 1, the engine E can be mounted or dismounted simply from the side through the passage 50 without excessively lifting the engine E as required in the prior art where only the opening 1 is formed. Moreover, for mounting and dismounting of the engine E, attachment and removal of the bolts by which the engine E is fixed to the body A can be very easily performed.

With the deck structure, the air intake chamber 12 can be taken out from the inside of the body A to the outside simultaneously with the hatch 3, therefore, the cleaning of the air intake chamber 12 and a filter 12*f* (see FIG. 4) or the like in the air intake chamber 12 can be made easily.

Furthermore, for adjusting the carburetor 11, the worker's hands can be easily reached for an adjusting screw (not shown) of the carburetor by detaching the hatch 3. Thus, the worker can adjust the carburetor 11 at ease.

In the above embodiment, the opening 8 and the hatch 3 are disposed in the port of the body A in which the air intake chamber 12 is located. However, they may be disposed in a starboard of the body A or they may be disposed in both of the starboard and port of the body A.

Instead of the hatch 3 of the lifting type, a hinge member can be arranged in the front end, rear end or lower end of the hatch 3 like a hinged door. In this case, the connecting structure between the air intake chamber 12 and the carburetor 11 differs from the structure of the above embodiment. For example, the connecting hole is formed on a side surface of the air intake chamber 12 facing the carburetor 11.

Figure 6:
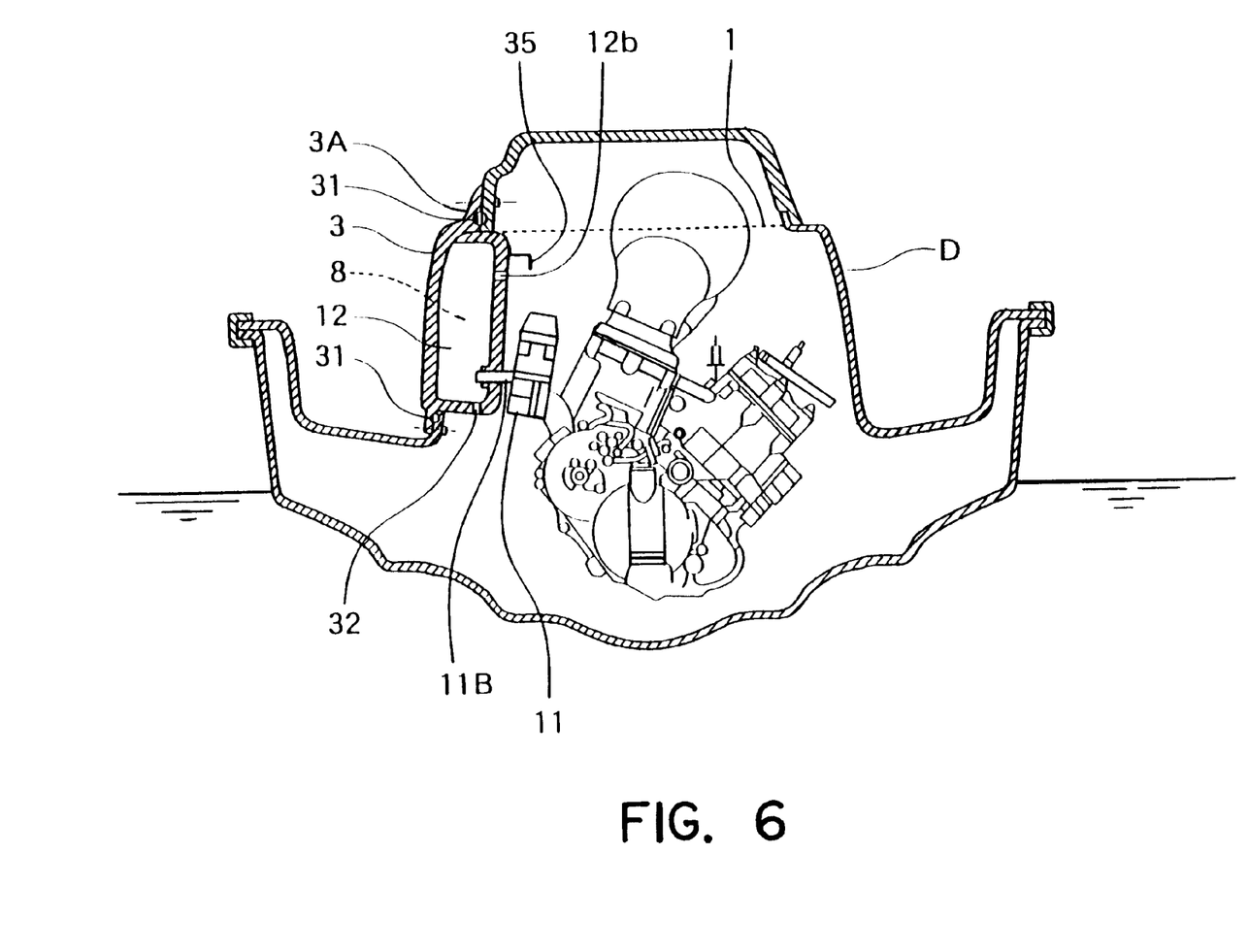
FIG. 6 is a sectional view taken on arrow VI—VI of FIG. 2, showing the personal watercraft according to an another embodiment different from the embodiment shown in FIG. 3.

As shown in FIG. 6, when the side opening 8 formed in upright portion D1 of the deck D is the independent opening apart from the opening 1, peripheral edge 3A of the hatch 3 may be larger than the peripheral edge of the side opening 8, so that the peripheral edge 3A can be fixed to the upright portion D1 by the bolts and nuts, and the seal member 31 is inserted between the peripheral edge 3A and the upright portion D1. Also in this case, as shown in FIG. 6, the visor 35 for preventing the water from flowing into the air intake chamber, is preferably formed over the inlet port 12*b*. The drain hole 32 is preferably formed in the bottom surface of the air intake chamber 12. In FIG. 6, numeral 11B denotes the inlet connecting pipe of the carburetor 11 inserted in the connecting hole 12*a*.

Figure 7A:
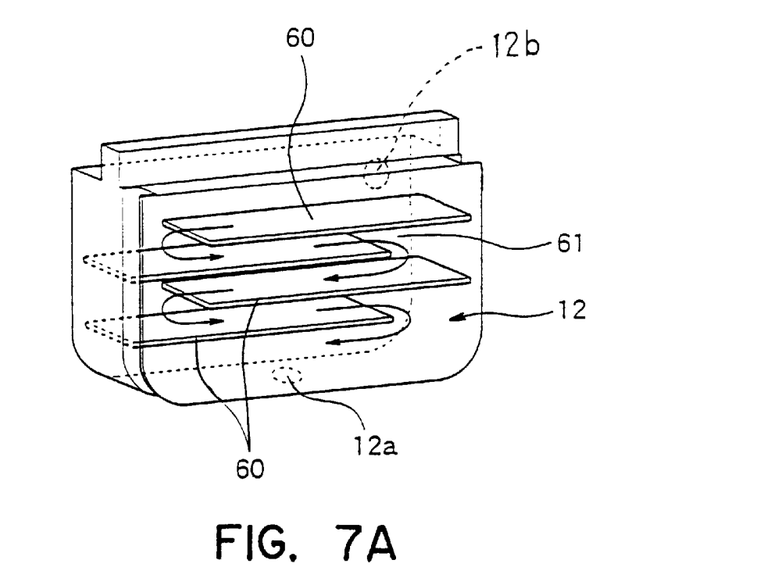
FIG. 7A is a perspective view of the air intake chamber seen from outside of a body, and FIG. 7B (b) is a sectional view in the direction perpendicular to the longitudinal direction of the air intake chamber.
Figure 7B:
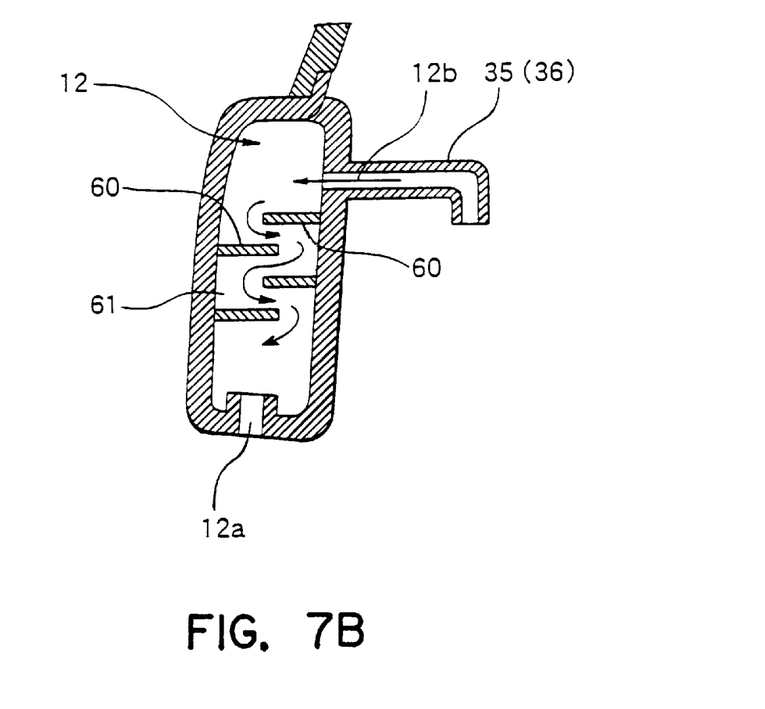

As shown in FIGS. 7A and 7B, partition plates 60 may be arranged in the air intake chamber 12 between the inlet port 12*b* and the connecting hole 12*a* for the inlet connecting pipe 11B (not shown in FIGS. 7A and 7B; see FIGS. 3 and 6), whereby an air intake passage 61 is formed in zigzag pattern to prevent the water from flowing into the inlet connecting pipe 11B. In the air intake chamber 12 shown in FIG. 7A, the air intake passage 61 is defined along the longitudinal direction of the air intake chamber 12 (i.e. the longitudinal direction of the body A). In the air intake chamber 12 shown in FIG. 7B, the air intake passage 61 is defined along the lateral direction of the air intake chamber 12 (i.e. the lateral direction of the body A). In FIG. 7B, reference numeral 35 denotes the visor for preventing the water from flowing into the air intake chamber 12. The inlet connecting pipe of the carburetor and the drain hole are not shown in these drawings. The visor is not shown in FIG. 7A.

The visor 35 shown in FIG. 7B, may be formed by an inverted L-shaped pipe 36 having an air passage therein. Such structure is more effective to prevent water from flowing into the air intake chamber 12.

The visor 35 may be formed integrally with the air intake chamber 12 or separately formed to be attached to the air intake chamber 12.

According to the deck structure for the personal watercraft of the invention, mounting and dismounting of the engine can be performed more easily and rapidly, and the necessary maintenance in the engine space can also be performed more easily and rapidly under a visual observation. It is also possible to sufficiently ensure the capacity of the air intake chamber.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A personal watercraft including a body having a deck and a hull comprising;

said deck having an opening over which a seat is provided, in a rear upper surface of said deck, said opening being substantially rectangular shape in plan view along the longitudinal direction of said body, said deck further having an upright portion formed on a side part thereof under said seat, and having a side opening formed in said upright portion;

a hatch detachably disposed in said side opening; and an upper end of said side opening is formed to connect to said opening formed under said seat;

whereby an engine space and an outside of the body are made to communicate with each other through said side opening.

2. The deck structure according to claim 1, wherein said hatch is attached to said side opening through a seal member.

3. The deck structure according to claim 1, wherein said side opening has a length substantially equal to an overall length of an engine body.

4. The deck structure according to claim 1, wherein an air intake chamber is integrally formed with a wall surface of said hatch on the side of the engine space.

5. The deck structure according to claim 4, wherein said hatch is attached to and detached from said side opening by the vertical movement of said hatch, a connecting hole is formed in a lower portion of said air intake chamber, and an inlet connecting pipe of a carburetor is connectable to said connecting hole.

6. A personal watercraft including a body having a deck and a hull comprising;

said deck having an opening over which a seat is provided, in a rear upper surface of said deck, said opening being substantially rectangular shape in plan view along the longitudinal direction of said body, said deck further having an upright portion formed on a side part thereof under said seat, and having a side opening formed in said upright portion;

a hatch detachably disposed in said side opening; and an air intake chamber is integrally formed with a wall surface of said hatch on the side of the engine space;

whereby an engine space and an outside of the body are made to communicate with each other through said side opening.

7. The deck structure according to claim 6, wherein said hatch is attached to and detached from said side opening by the vertical movement of said hatch, a connecting hole is formed in a lower portion of said air intake chamber, and an inlet connecting pipe of a carburetor is connectable to said connecting hole.

* * * * *